US006564548B2

(12) United States Patent
Nishimura et al.

(10) Patent No.: US 6,564,548 B2
(45) Date of Patent: May 20, 2003

(54) SPEED CONTROL APPARATUS OF WORKING VEHICLE AND SPEED CONTROL METHOD THEREOF

(75) Inventors: Satoru Nishimura, Oosaka-fu (JP); Takumi Nagahara, Oosaka-fu (JP)

(73) Assignee: Komatsu Limited, Tokyo (JP)

( * ) Notice: Subject to any disclaimer, the term of this patent is extended or adjusted under 35 U.S.C. 154(b) by 0 days.

(21) Appl. No.: 09/960,466

(22) Filed: Sep. 20, 2001

(65) Prior Publication Data

US 2002/0073699 A1 Jun. 20, 2002

(30) Foreign Application Priority Data

Oct. 3, 2000 (JP) ....................................... 2000-303838
Jun. 25, 2001 (JP) ....................................... 2001-190780

(51) Int. Cl.[7] ............................. F16D 31/02; E02F 9/20

(52) U.S. Cl. ............................. 60/431; 60/452; 91/453

(58) Field of Search .......................... 60/422, 431, 445, 60/452; 91/453

(56) References Cited

U.S. PATENT DOCUMENTS

| | | | | |
|---|---|---|---|---|
| 5,077,973 A | * | 1/1992 | Suzuki et al. ................. | 60/431 |
| 5,692,377 A | | 12/1997 | Moriya et al. | |
| 5,996,341 A | | 12/1999 | Tohji | |

FOREIGN PATENT DOCUMENTS

| | | |
|---|---|---|
| JP | 2863599 | 12/1991 |
| JP | 11-209074 | 8/1999 |

* cited by examiner

*Primary Examiner*—Edward K. Look
*Assistant Examiner*—Thomas E. Lazo
(74) *Attorney, Agent, or Firm*—Bell, Boyd & Lloyd LLC

(57) ABSTRACT

A speed control apparatus and method of a working vehicle which can reduce a working speed and a traveling speed of the vehicle to a desired speed range in correspondence to a change of working conditions at a time of a vehicle crane operation. A controller sets an optional hydraulic pump absorbing curve when an operator selects the crane operation mode. When the speed is adjusted by the operator, a pump tilt and rotation angle is automatically controlled to a pump absorbing torque in correspondence to the crane working speed along the optional pump absorbing torque curve.

4 Claims, 4 Drawing Sheets

SPEED CONTROL APPARATUS OF WORKING VEHICLE AND SPEED CONTROL METHOD THEREOF

BACKGROUND OF THE INVENTION

1. Field of the Invention

The present invention relates to a speed control apparatus of a working vehicle such as a vehicle for a construction, civil engineering work and the like, which is provided with a crane function, and a speed control method thereof. More particularly, it relates to a speed control apparatus of a working vehicle which can adjust a working speed of a working machine and a traveling speed of the vehicle within a predetermined speed range under a crane mode so as to improve a working efficiency, and a speed control method thereof.

2. Description of the Related Art

A working vehicle for various kinds of construction, civil engineering machines and the like is provided with a working machine comprising a revolving frame mounted onto an undercarriage so as to freely revolve around a vertical axis, and a main boom, a stick boom, a bucket, a suspending hook and the like mounted on the revolving frame. A discharged pressure oil supplied from a variable delivery pump is supplied to a main boom cylinder, a stick boom cylinder, a bucket cylinder, a revolving motor, a traveling motor and the like, whereby the working vehicle drives or travels each of the working machines.

An example of the working vehicle mounted with such actuators is disclosed, for example, in Japanese Patent No. 2863599. A hydraulic working machine as disclosed in the publication is provided with an accelerator lever for setting an engine speed, an engine-speed command transmitting device for detecting an amount of operation of the accelerator lever so as to output an engine speed command signal in correspondence to the amount of the operation, engine speed setting means for increasing and reducing the engine speed, flow amount adjusting means for increasing and reducing a pump flow amount of a variable delivery pump, a relief valve for setting a maximum operating pressure in a discharge side of the pump, and relief pressure setting means for setting a maximum pressure of a pressure oil introduced to actuators for a working machine.

Further, the hydraulic working machine is provided with working mode selecting means, which previously stores various kinds of working modes such as a working mode for working the actuators at a high speed, a working mode for executing a precise work and the like, in addition to a combination of an application force and a working speed of the actuators required for a normal work, in order to freely select the working mode.

When an operator selects a desired working mode by the working mode selecting means in correspondence to working contents and working conditions to be executed, the working mode selecting means selects at least one of a maximum engine speed, a maximum discharge flow amount of the pump and a maximum pressure of the pressure oil introduced to the working machine actuators, which are previously stored for each selected working mode, and outputs as a working mode command signal to a controller.

The controller receives the working mode command signal from the working mode selecting means and the engine speed command signal from the engine speed command transmitting device, and suitably selects the maximum engine speed among the working mode command signal and the engine speed command signal so as to output the command signal to the engine speed setting means. At the same time, the controller outputs the command signal to the pump flow amount adjusting means on the basis of the working mode command signal, and outputs the command signal to the relief valve and the relief pressure setting means.

In the manner as mentioned above, the controller outputs the command signal to the flow amount adjusting means and the engine speed setting means such that the working speed of the actuators operated on the basis of the command signal output from the controller is neither too much nor too little, thereby controlling the discharge oil amount of the variable delivery pump. At the same time, the controller outputs the command signal to the relief valve and the relief pressure setting means so that a working force of the actuator is neither too much nor too little, thereby controlling the pressure of the pressure oil flowing into the actuator.

In accordance with the conventional hydraulic working vehicle, the flow amount and the maximum pressure of the pressure oil flowing into the actuators are automatically restricted by the engine speed setting means, the flow amount adjusting means, the relief pressure setting means and the like. Accordingly, it is possible to obtain the working speed and the application force, which are optimum for the working contents and the working conditions of the selected working mode.

On the other hand, in this kind of working vehicle, a working speed of a main boom cylinder and a stick boom cylinder at the time of normal excavating operation, a dumping operation or the like is set such that, for example, a speed at the time of ascending the main boom and the stick boom is about 30% of a speed at the time of descending them. This can be applied in the same manner even to a hydraulic working vehicle having a crane function, in which a suspending hook is mounted to a stick boom front end portion of a normal working vehicle. Even when it is switched to a crane mode, an ascending speed of a peripheral portion of the suspending hook is widely delayed in comparison with a descending speed thereof.

The hydraulic working machine disclosed in the patent publication mentioned above previously expects various kinds of preferable working modes corresponding to various kinds of driving and operating conditions, and stores them in the working mode selecting means. However, these working modes are selected by the operator himself on the basis of his/her sense and judgement with respect to environmental conditions immediately before starting the operation, even when the working contents and the working conditions have changed. For example, under a condition that various environments such as a change in the weather, a change in the working range, with or without an obstacle and the like are generated, an operation of the set working mode does not always coincide with an actually executed working condition.

The controller only uniformly outputs the command signal corresponding to the set working mode to the engine, the variable delivery pump, the relief valve and the like. Thus, once a certain mode is set, it is impossible to change the set working speed and the set working pressure of the working machine in the working mode, even in the case that a change has been generated in the executed working contents or the working conditions. Accordingly, in the case that the preset working mode does not comply with the actual working condition, or in the case that it is not a mode that can correspond to a skill of the operator, the operation has to be executed within the working mode range. Therefore, a working efficiency or the like is easily reduced.

In particular, in the working vehicle provided with the crane function, since the operation is executed in a state that the descending speed of the periphery of the suspending hook and the ascending speed thereof are widely different from each other, as in the same manner as that at the normal excavating time as mentioned above, even when it is switched to the crane working mode. Therefore, the operator who operates the crane within a cab can not be used to the speed difference, so that he/she can hardly expect the switching timing between the ascending operation of the suspended load and the descending operation thereof, whereby a working efficiency is going to be reduced.

SUMMARY OF THE INVENTION

The present invention is made in order to solve the conventional problems. An object of the present invention is to provide a speed control apparatus of a working vehicle which can reduce a working speed of a working machine and a traveling speed of a vehicle to a desired speed range in correspondence to a change of working contents and working conditions at the time of executing a crane operation on the basis of a preset crane mode, thereby improving a working efficiency or the like, and to provide a speed control method thereof.

In accordance with a first aspect of the present invention, there is provided a speed control apparatus of a working vehicle for controlling a working speed of each actuator at the time of being in a crane mode, comprising: setting means for a maximum engine speed to be set at the time of being switched to the crane mode; setting means for a proper pump absorbing torque curve at the time of being switched to the crane mode; setting means for setting a pump discharge amount introduced from an intersecting point of an engine speed torque curve at the maximum engine speed with the proper pump absorbing toque curve to be an upper limit; setting means for an optional pump absorbing torque curve being within a range of the engine speed torque curve and capable of obtaining an optional pump discharge amount which is smaller than the pump discharge amount set as the upper limit and which is larger than the pump discharge amount introduced from the pump absorbing torque in correspondence to a minimum engine speed at the time of being in the crane mode; and setting means for setting a swash plate angle in correspondence to a change of the pump absorbing torque.

In accordance with the first aspect of the present invention, when being switched to the crane mode, a signal for reducing to a preset engine speed is output from a controller. The engine speed at this time corresponds to the largest engine speed required at the time of a crane operation. Accordingly, the controller previously stores such information as an engine speed torque curve, a minimum engine speed required for the working vehicle, a proper pump absorbing torque at the time of being in the crane mode operation, and the like. A pump absorbing torque curve in correspondence to each of the engine speeds is calculated on the basis of a control program at the time of selecting the crane mode, in the speed range of the maximum engine speed set at the time of being switched to the crane mode and the minimum engine speed required for the working vehicle.

That is, the pump discharge amount introduced from the pump absorbing torque at the intersecting point of the engine speed torque curve in correspondence to the maximum engine speed with the pump absorbing torque curve within the engine speed range is set to be an upper limit value thereof. The pump absorbing torque curve is set by connecting that upper limit value with the pump discharge amount introduced from the proper pump absorbing torque in correspondence to the minimum engine speed required for the working vehicle at an optional point. In this case, however, it is necessary that the value of the pump absorbing torque in correspondence to each of the engine speeds, which is optionally selected at this time, should be within the range surrounded by the engine speed torque curve.

When the operator has selected the crane mode, the engine speed is automatically reduced to a predetermined engine speed. At the same time, the swash plate angle is changed on the basis of the command from the controller so as to become the pump discharge amount corresponding to the upper limit value previously set. At the time of being in the crane mode, when the operator further adjusts the working speed of the crane, the swash plate angle is automatically controlled to the pump absorbing torque corresponding to the working speed of the crane, for example, along the above-mentioned optional pump absorbing torque curve set between the maximum engine speed and the minimum engine speed. That is, the working speed of the actuators, the driving speed of the traveling motor and the like in the current crane mode are expanded within the pump absorbing torque range between the upper limit value and the lower limit value of the pump discharge amount.

In the manner mentioned above, even under various environments such as the change of the working range, with or without the obstacle and the like, it is possible to effectively obtain an optimum crane mode corresponding to the executed working contents, the working conditions, the skill of the operator and the like, so that not only it is possible to realize a stable traveling property of a vehicle and an operability of the working machine, but also it is possible to significantly improve an operation efficiency and the like.

Further, in accordance with the first aspect of the present invention, it is preferable that the speed control apparatus further comprises pilot pressure adjusting means in a side of a pilot pressure receiving chamber for supplying a hydraulic pressure of a main valve that distributes a working fluid to a main boom cylinder, a hydraulic motor and the like, wherein an opening area of the main valve is adjusted by the pilot pressure adjusting means.

For example, in the main boom cylinder, the main boom is operated in a stand-up direction thereof in accordance with an extending motion of the main boom cylinder and is operated in a tilt-down direction in accordance with a contracting motion thereof. However, since a position of a center of gravity of the main boom exists at a front portion of the upperstructure, a force in a contracting direction for tilting down the main boom is applied to the main boom cylinder due to a weight of the suspended load or the like. When the main boom is tilted down at the time of operation of the crane, it is impossible to slow the tilt-down speed of the main boom only by controlling the pump flow amount.

In accordance with the first aspect of the invention, the upper limit of the maximum speed at the time of tilting down the main boom is set by controlling the supply of the pilot pressure oil by the pilot pressure adjusting means. The tilt-down speed of the main boom is slowed by adjusting a stroke of the spool of the main valve within the speed range having the main boom tilt-down speed as the upper limit and making it smaller than the opening area of the normal spool to reduce the flow amount of the pressure oil supplied to the main boom cylinder head side. As mentioned above, it is possible to further make the tilt-down speed of the main boom slower than the speed of the normal crane mode, so that an operability of the crane executed by the operator is improved.

Furthermore, in accordance with the first aspect of the present invention, it is preferable that an opening area of the main valve for distributing working fluid to an actuator such as a main boom cylinder and the like at the time of being in the crane mode is set such that a descending speed of a peripheral portion of a suspending hook mounted to a front end side of a stick boom is reduced to be substantially equal to an ascending speed thereof.

In the conventional working vehicle provided with a crane function, even when being switched to the crane mode, a great difference exists between the ascending speed and the descending speed of the peripheral portion of the suspending hook, that is, the ascending speed and the descending speed at the time when the main boom and the stick boom swing, in the same manner as the normal working mode as mentioned above. Thus, the descending speed is widely larger than the ascending speed, so that the operator can not easily grasp the speed difference. Therefore, it is hard to estimate the switching timing for ascending and descending the suspended load, and a great influence bears on the working efficiency.

Then, in accordance with the first aspect of the present invention, the structure is made such that when being switched to the crane mode, it is possible to automatically or intentionally adjust the opening area in the descending side of the main valve for the main boom and/or the stick boom to be substantially equal to the opening area in the ascending side thereof. This adjustment can be executed, for example, by using the pilot pressure adjusting means as mentioned above. As the pilot pressure adjusting means, there is a simple pressure reducing valve besides an electric hydraulic control valve, which will be mentioned in an embodiment of the present invention.

The electric hydraulic control valve is so structured that when a signal responding to an operation amount executed by the crane mode switch at the time of operating the crane is input to the electric hydraulic control valve via the controller, a throttle area of the electric hydraulic control valve set in correspondence to an input amount is controlled within a range of a set speed of the main boom at the time of being in the crane mode. That is, it is possible to finely adjust a flow amount of the pressure oil supplied from the descending side of the main valve to the main boom cylinder and/or the stick boom cylinder so as to be substantially equal to a flow amount of the pressure oil supplied to the ascending side of each of the cylinders via the main valve, within the speed range at the time of being in the crane mode. Further, in the case of using the electric hydraulic control valve, the speed set mentioned above can be achieved even in the case of inputting to the electric hydraulic control valve via an independent signal output system without directly connecting to the controller mentioned above. Thus, it is possible to adjust a flow amount on the spot on the basis of the conditions of the working field.

On the other hand, in the case that it is not required to finely adjust in the working field, it is preferable to use a pressure reducing valve for the pilot pressure adjusting means. In this case, the pressure oil supplied to the pilot pressure receiving chamber in the descending side of the main valve is pressure reduced to the preset pressure via the pressure reducing valve, and the opening area of the main valve is adjusted such that the flow amount of the pressure oil supplied from the descending side of the main valve with respect to the main boom cylinder and/or the stick boom cylinder becomes substantially equal to the flow amount of the pressure oil supplied to the ascending side of each of the cylinders via the main valve.

In the manner as mentioned above, when being switched to the crane mode from the normal working mode, it is possible to automatically or intentionally adjust the descending speed of the main boom and/or the stick boom so as to be substantially equal to the ascending speed thereof. Therefore, the operator can smoothly execute the crane operation, whereby an operation efficiency can be improved.

In accordance with a second aspect of the present invention, there is provided a speed control apparatus of a working vehicle having control means for controlling a speed of a hydraulic motor at the time of being in the crane mode, including: fixing means for maintaining a tilt and rotation angle of the hydraulic motor in a larger side thereof so as to be fixed to a low speed side at the time of being switched to the crane mode.

In accordance with the second aspect of this invention, at the time of being switched to the crane mode, the tilt and rotation angle of the hydraulic motor is maintained in the larger side and the hydraulic motor is rotated at a low speed by operation of the fixing means, for example, having a cut valve for freely supplying and shutting, or the like. An upper limit of a maximum speed of the hydraulic motor is set. The speed is adjusted within the speed range having this upper limit speed, and the speed of the hydraulic motor is locked in a low speed side without being affected by the stroke of the spool of the main valve. Since the upper limit of the maximum speed of the hydraulic motor is set in the manner as mentioned above, it is possible the travelling and revolving are smoothly performed at the time of the operation of the crane.

A working speed control method of various kinds of actuators in a working vehicle in accordance with a third aspect of the present invention can be executed by using the speed control apparatus as mentioned above. According to a typical method of the present invention, there is provided a speed control method of a working vehicle controlling a working speed of each of actuators at the time of being in a crane mode, comprising steps of: setting a maximum engine speed at the time of being switched to the crane mode; setting a proper pump absorbing torque curve at the time of being switched to the crane mode; setting a pump discharge amount introduced from an intersecting point of an engine speed torque curve at the maximum engine speed with the proper pump absorbing toque curve to be as an upper limit; setting an optional pump absorbing torque curve being within a range of the engine speed torque curve and capable of obtaining an optional pump discharge amount which is smaller than the pump discharge amount set as the upper limit and which is larger than the pump discharge amount in correspondence to a minimum engine speed at the time of being the crane mode; and setting a swash plate angle in correspondence to a change of the pump absorbing torque.

In accordance with the third aspect of this invention, when the operator selects the crane mode, the controller sets the pump discharge amount at the intersecting point between the engine speed torque curve at the predetermined maximum engine speed and the proper pump absorbing torque curve previously set on the basis of the calculation to be as the upper limit value as mentioned above. There is set the optional pump absorbing torque curve obtained by connecting the upper limit value with the pump discharge amount in correspondence to the pump absorbing torque required in correspondence to the predetermined minimum engine speed required for the working vehicle.

In the case that it is intended to restrict the working speed to a low level in correspondence to the change of the work contents and the working conditions, the skill of the operator or the like when the crane operation is executed on the basis of the set crane mode, the operator selectively operates, for example, a speed adjusting switch (an engine speed dial) so that the engine speed is set along the optional pump absorbing torque curve set between the maximum engine speed and the minimum required engine speed on the basis of the output signal of the speed adjusting switch and the swash plate angle is set on the basis of the pump absorbing torque in correspondence to the engine speed.

It is possible to further reduce the engine speed, the pump discharge amount and the like in correspondence to the change of the work contents and the working condition, the skill of the operator or the like, and it is possible to adjust the working speed of the working machine cylinder, the driving speed of the traveling motor and the like at the time of being in the current crane mode to be an optional speed.

Further, in accordance with the third aspect of the present invention, it is preferable that the speed control method comprises a step of setting a descending speed of a periphery of a mounting portion of a suspending hook mounted to a front end side of the stick boom so as to be reduced to be substantially equal to an ascending speed thereof.

The speed set can be realized by using the pilot pressure adjusting means with respect to the main valve for the main boom and the stick boom as mentioned above. The descending speed of the periphery of the mounting portion of the suspending hook onto the front end side of the stick boom is reduced so as to be substantially equal to the ascending speed thereof, in such a manner that the opening area of the descending side of the main valve becomes substantially equal to the opening area of the ascending side thereof, only at the time of being in the crane mode. As mentioned above, since the speed is reduced so as to become substantially equal to the ascending speed which is inherently set to be widely lower than the descending speed, it is possible to smoothly execute a further operation and it is possible to achieve an efficiency of the operation.

DESCRIPTION OF THE PREFERRED EMBODIMENTS

A description will be particularly given below of a preferred embodiment in accordance with the present invention with reference to the accompanying drawings.

Figure 1:
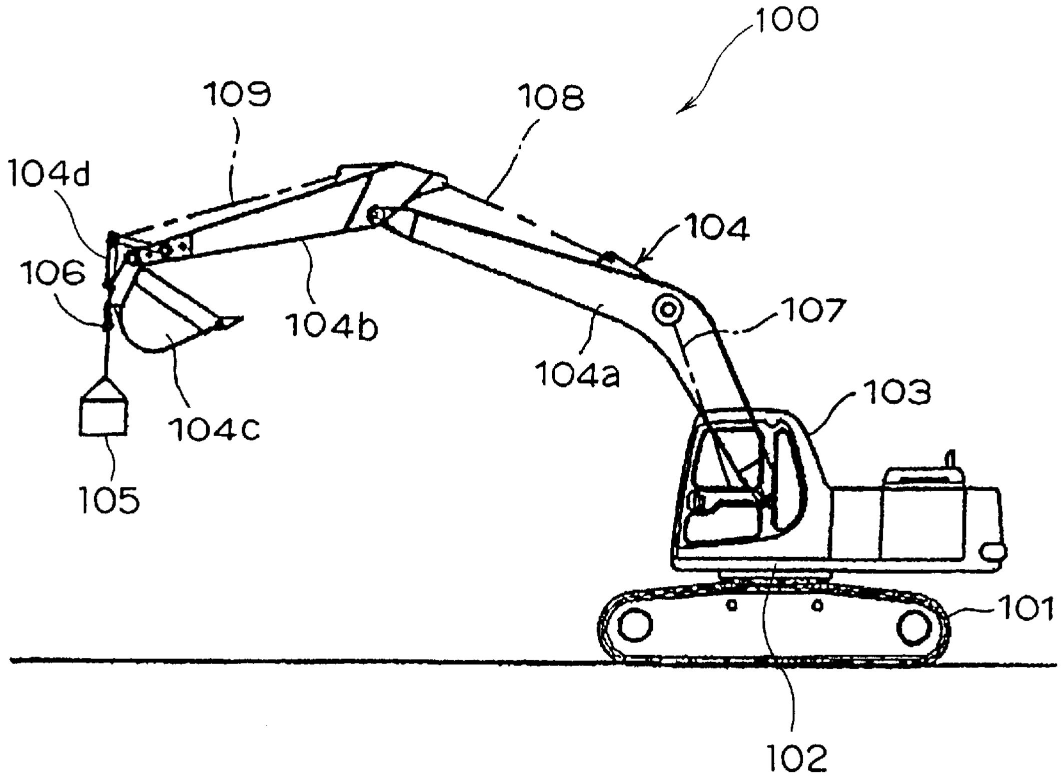
FIG. 1 is a schematic outside view of a hydraulic excavator with a crane provided with a working mode in accordance with a typical embodiment of the present invention.

FIG. 1 shows a hydraulic excavator with a crane in accordance with a typical embodiment of the present invention. In the present embodiment, the hydraulic excavator with a crane will be exemplified, however, the present invention is not limited to this but can be applied to various kinds of working vehicles, for example, a bulldozer, a truck crane, a tractor shovel and the like.

A hydraulic excavator 100 with a crane in accordance with the present embodiment is provided with an undercarriage 101, a revolving frame 102 mounted onto the undercarriage 101 so as to freely revolve around a vertical axis, an upperstructure 103 provided with a cab, an engine and the like and placed on the revolving frame 102, and a working machine 104 mounted onto the upperstructure 103. The working machine 104 is provided with a main boom **104*a* standing from a substantially center of the upperstructure 103, a stick boom 104*b* pivoted to a free end of the main boom 104*a* so as to swing in a vertical direction, a bucket 104*c* supported to a front end of the stick boom 104*b* so as to swing in a vertical direction, and a suspending hook 106 for a crane operation, which lifts a suspended load 105**.

The main boom **104*a* ascends and descends in a vertical direction pivotally about a base end thereof by means of a pair of main boom cylinders 107 provided between the main boom 104*a* and the revolving frame 102. The stick boom 104*b* swings in a vertical direction about a front end of the main boom 104*a* as a pivot by means of stick boom cylinders 108 attached between the stick boom 104*b* and the main boom 104*a*. The bucket 104*c* rotates in a vertical direction around a front end of the stick boom 104*b* as a pivot by means of bucket cylinders 109 mounted to the bucket 104*c* and the stick boom 104*b* via a pair of right and left two-section links 104*d*. The suspending hook 106 is, for example, rotatably supported to a stick boom top pin to be attached with the bucket 104*c* at a front end of the stick boom 104*a***.

At the time of operating the crane, as shown in FIG. 1, in order to avoid an interference between the bucket **104*c* and the suspending hook 106, the bucket cylinders 109 are extended to a maximum excavating position of the bucket 104*c*, and is stopped in a state that a scooping surface side of the bucket 104*c* is moved closest to the stick boom side. In that stopped state, the crane operation is executed with the suspending hook 106. The suspending hook 106 is stored between the right and left links 104*d*** at the time of not being used.

Figure 2:
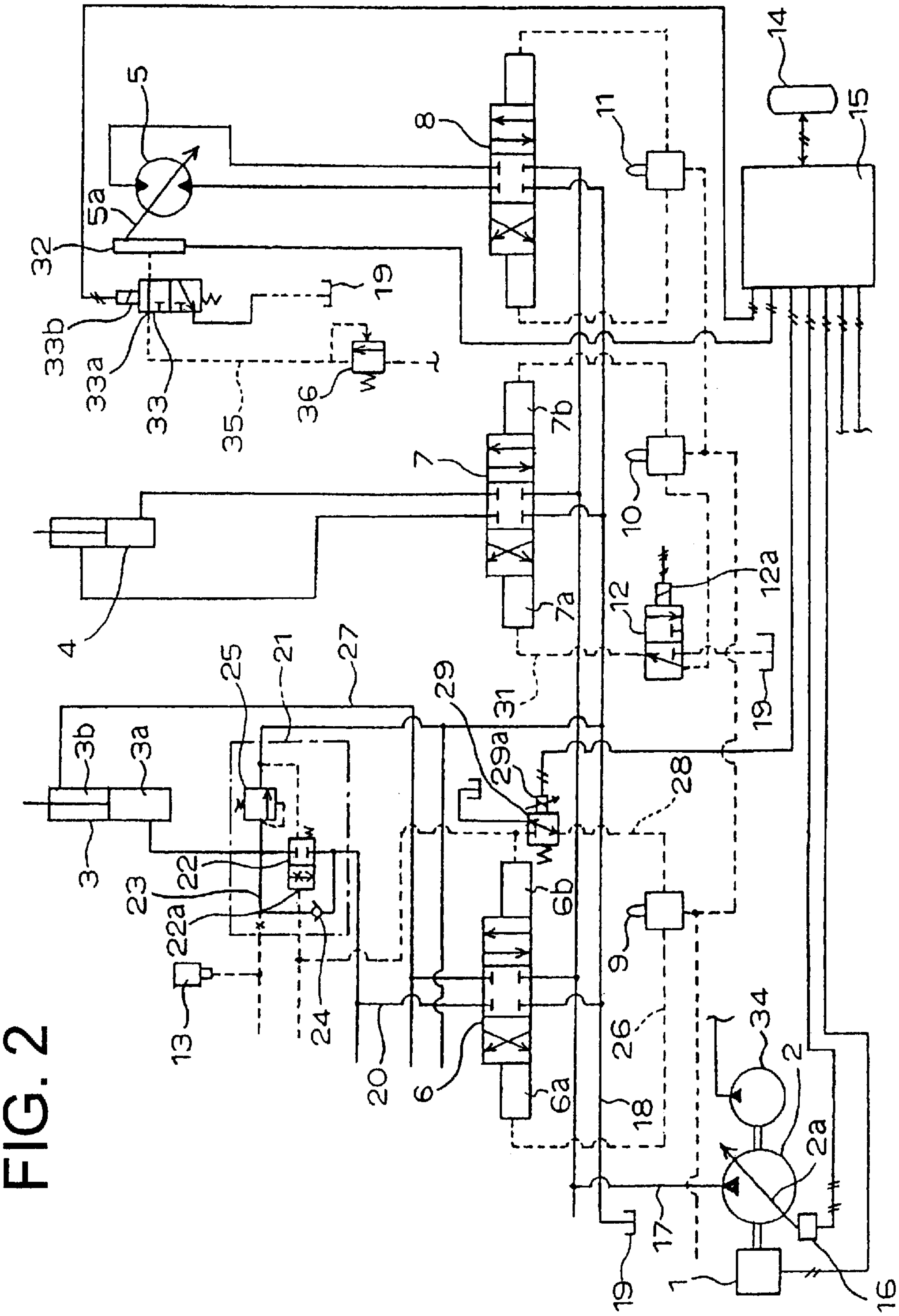
FIG. 2 is a control circuit diagram schematically showing an electric hydraulic system of the hydraulic excavator with a crane provided with the working mode in accordance with the typical embodiment of the present invention.

FIG. 2 is a control circuit diagram schematically showing an electric hydraulic system of the hydraulic excavator 100 with a crane. In this case, in FIG. 2, in order to be easily understood, an illustration of an electric hydraulic system supplied to the stick boom cylinders 108 is omitted. The electric hydraulic system for the stick boom cylinders is provided with substantially the same circuit structure as that of an electric hydraulic system for the main boom cylinders.

As shown in FIG. 2, the hydraulic excavator 100 is provided with an engine 1, a variable delivery pump 2 to be driven by the engine 1, a plurality of actuator operating valves 6 to 8 for selectively supplying discharge pressure oil from the variable delivery pump 2 to various kinds of actuators such as the main boom cylinders 107, the bucket cylinders 109, a traveling motor 5 and the like, a stick boom operating valve (not shown), and a plurality of operating levers 9 to 11 for independently switching the respective operating valves 6 to 8. Further, in FIG. 2, there are shown one main boom cylinder 107, one bucket cylinder 109, one traveling motor 5, the main boom valve 6 corresponding to said one main boom cylinder 107, the bucket valve 7 corresponding to said one bucket cylinder 109 and the traveling valve 8 corresponding to said one traveling motor 5, among the various kinds of actuators.

Further, there are provided an solenoid controlled valve 12 for inhibiting a dumping operation (a cylinder contracting motion) of the bucket 104*c* at the time of the crane operation when the suspending hook 106 is not stored between the right and left links 104*d*, a pressure sensor 13 for detecting a hydraulic pressure of a bottom side 107*a* of the main boom cylinder 107 for confirming a safe load, a crane mode switch 14 for being turned on at the time of executing the crane operation in accordance with a preset crane mode, and a controller 15 for controlling an engine speed of the engine 1, a discharge amount of the variable delivery pump 2 and the like based on an output signal of the crane mode switch 14.

The controller 15 is connected with a speed adjusting switch (not shown), an engine speed dial (not shown) that can select the speed, and the like. Further, there are provided an engine speed sensor (not shown) for electrically detecting the engine speed, a tilt and rotation angle sensor (not shown) for electrically detecting an angle of tilt and rotation of a swash plate, a pressure sensor (not shown) for electrically detecting a pump discharge pressure, and the like. A signal of each of the sensors, the crane mode switch 14, the speed adjusting switch, the engine speed dial and the like is output to the controller 15 to be arithmetically processed on the based of a control program, thereby controlling the engine 1 and the variable delivery pump 2.

The engine 1 is provided with a fuel injection pump (not shown) and an electric governor motor (not shown). On the basis of a command signal output from the controller 15, a lever of the fuel injection pump is made to swing between a position of high speed rotation and a position of low speed rotation via an operating portion provided in the electric governor motor, thereby controlling an amount of fuel fed to a fuel injection nozzle of the fuel injection pump. The variable delivery pump 2 is comprised of a swash plate type piston pump, and changes an angle of tilt and rotation of a swash plate 2*a* via capacity controlling means 16 on the basis of the command signal output from the controller 15, whereby a discharge amount of a pressure oil supplied to the main boom cylinder 107, the bucket cylinder 109 and the traveling motor 5 is controlled.

Each of the main boom valve 6, the bucket valve 7 and the traveling valve 8 is comprised of a flow-amount control valve of four-port three-position closed center type which switches to a bottom side, a head side or a non-operation position (a neutral position) in accordance with its operating position. The pressure oil discharged from the variable delivery pump 2 is selectively supplied to the main boom valve 6, the bucket valve 7 and the traveling valve 8 via an output circuit 17. Return oil from the main boom cylinder 107, the bucket cylinder 109 and the traveling motor 5 flows back to an oil tank 19 via a drain circuit 18.

The operating levers 9 to 11 have first and second pilot proportional control valves (not shown) for outputting a pilot hydraulic pressure. Pilot oil supplied from the pilot proportional control valve is increased in accordance with an operating amount (an angle) of the operating levers 9 to 11, so that opening degrees of spools in the main boom valve 6, the bucket valve 7 and the traveling valve 8 are increased by the pilot pressure of the increased pilot flow. In correspondence to the opening degrees, a flow amount of the discharge pressure oil supplied to the main boom cylinder 107, the bucket cylinder 109 and the traveling motor 5 is increased.

A rotation preventing valve 21 is connected to a first oil passage 20 for connecting the bottom side 107*a* of the main boom cylinder 107 to the main boom valve 6. The rotation preventing valve 21 keeps a cylinder internal pressure so as to prevent the main boom 104*a* from free fall descent. The rotation preventing valve 21 has a switch valve 22 with a throttle for shutting or outwardly discharging the pressure oil within the main boom cylinder 107, a check valve 24 arranged in a passage 23 connecting front and rear portions of the switch valve 22 and open to the cylinder side, and a safety valve 25 securing a set pressure within the main boom cylinder 107. The safety valve 25 is connected to the drain circuit 18 connected to the passage 23 at an output side of the check valve 24.

When the main boom lever 9 is operated toward a main boom ascending side, the pilot pressure oil supplied from the lever 9 acts on a first pressure receiving portion 6*a* of the main boom valve 6 via a first pilot circuit 26 so as to switch the main boom valve 6 to an ascending side. The discharged oil supplied from the variable delivery pump 2 is supplied to the bottom side 107*a* of the main boom cylinder 107 via the check valve 24 with bypassing to the passage 23 from the first oil passage 20. On the other hand, the pressure oil in the head side 107*b* is returned to the oil tank 19 via the drain circuit 18 from the main boom valve 6 through a second oil passage 27.

When the main boom lever 9 is operated toward the main boom descending side, the pilot pressure oil supplied from the lever 9 acts on a second pressure receiving portion 6*b* of the main boom valve 6 via a second pilot circuit 28 and acts on a first pressure receiving portion 22*a* of the switch valve 22. The switch valve 22 is switched to an open position, so that discharge oil supplied from the variable delivery pump 2 is supplied to the head side 107*b* of the main boom cylinder 107 through the second oil passage 27. On the other hand, the pressure oil in the bottom side 107*a* is returned to the oil tank 19 through the drain circuit 18 via the switch valve 22 and the main boom valve 6 from the first oil passage 20. Since a flow amount of the return oil is adjusted by the throttle of the switch valve 22, it is possible to slowly operate the main boom cylinder 107.

An electric hydraulic control valve 29 (hereinafter, refer to an EPC valve 29) as pilot pressure adjusting means is connected to the second pressure receiving portion 6*b* in the descending side of the main boom valve 6 via the second pilot circuit 28. The EPC valve 29 is so structured that it can be freely switched between a communicating position and a throttling position on the basis of a command signal output from the controller 15. When the command signal from the controller 15 is input to a solenoid 29*a* of the EPC valve 29 via a signal circuit in response to the operation by the crane mode switch 14 at the time of the crane operation, a passing opening of the throttle is controlled in proportion to an amount of electric current application to the solenoid 29*a* within a range of a set speed from an upper limit side working speed to a lower limit side working speed of the main boom 104*a* at the time of the set crane mode. Regardless of an amount of operation of the main boom lever 9, the working speed of the main boom is set within the set speed range.

When the EPC valve 29 is switched in response to the operation by the crane mode switch 14 at the time of the crane operation, a flow amount of the pilot pressure oil applied to the second pressure receiving portion 6*b* in the descending side of the main boom valve 6 is reduced by the operation of the main boom lever 9 toward the main boom descending side. As the opening area of the valve stroke of the main boom valve 6 becomes small, the flow amount to the head side 107*b* of the main boom cylinder 107 is reduced, so that the descending speed of the main boom becomes very slow without relation to a weight of the suspended load, or the like. Consequently, it is possible to make a fall-down speed of the main boom further slower than a speed of the crane mode at the normal time, so that a smoothness of the crane operation can be secured. In accordance with the present embodiment, the EPC valve 29 is connected to the pilot pressure receiving portion 6*b* in the descending side of the main boom valve 6, however, the present invention should not be limited to this. For example, the EPC valve or the like may be provided in a dump-side pilot pressure receiving portion of a stick boom valve (not shown).

Further, in accordance with the present embodiment, it is possible to reduce the descending speed of the main boom to be substantially equal to the ascending speed by utilizing the EPC valve 29. In this kind of working vehicle, the ascending speed of the main boom and/or the stick boom is normally set to be substantially one third of the descending speed. This can be also applied to the crane operation after being switched to the crane mode as well as the normal excavating operation and dumping operation. As has been already mentioned, such speed difference gives a great influence to a fine operation of the operator particularly at the time of the crane operation such as ascending and descending the load suspended on the suspending hook or moving it forward and backward.

At the time of the crane operation, for example when the suspending hook 106 suspending the load is ascended and descended, that is, swinging the main boom 104*a* and the stick boom 104*b* in a vertical direction, in a state that the stick boom cylinder 108 is extended at a maximum, a swinging operation of the main boom 104*a* and the stick boom 104*b* is executed by an operation of an operating lever (not shown) provided within the cab in a forward and backward direction. When the operating lever is tilted down to an opposite side of the operator (the main boom descending side) from the neutral position, it is possible to descend the periphery of the mounting portion of the suspending hook 106. On the other hand, by pulling the lever to the operator side (the main boom ascending side), it is possible to ascend it.

At this time, in both of the ascending side and the descending side of the main boom 104*a*, even when the amount of operation of the operating lever (an amount of displacement from the neutral position) is fixed, the ascending speed of the periphery of the mounting portion of the suspending hook 106 is increased at a degree of about one third of the descending speed, and the descending speed becomes about three times of the ascending speed. Accordingly, the lever operation of the crane operation does not match with the ascending and descending operation of the suspended load, so that the operator can not expect the ascending and descending motion of the suspended load in the suspended state. Thus, there is a case the lever operation is executed with hesitation thereby reducing an operation efficiency.

Then, in accordance with the present embodiment, an opening area of the valve strokes in the ascending side of the main boom valve and the stick boom valve is set to be substantially equal to an opening area of the valve stroke in the descending side thereof, such that the ascending speed and the descending speed are substantially equal to each other once being switched to the crane mode. For example, in the case of using the EPC valve 29 shown in FIG. 2, an arithmetic expression is previously stored in the controller 15 so that a ratio between the ascending speed and the descending speed of the main boom 104*a* and the stick boom (not shown) at the time of being in the crane mode becomes substantially 1. When the crane mode switch 14 is turned on, an amount of electric current application corresponding thereto is fed to the solenoid 29*a* of the EPC valve 29 via the controller 15, and the passing opening of the throttle of the EPC valve 29 is controlled, thereby controlling the descending speed of the main boom 104*a* and the stick boom within the range of the set speed from the upper limit side working speed to the lower limit side working speed of the main boom 104*a* and the stick boom at the time of being in the crane mode as mentioned above.

In accordance with the present embodiment, it is possible to optionally adjust the ratio between the ascending speed and the descending speed at the time of being in the crane mode within a desired range close to 1 instead of fixing the ratio to 1. That is, when it becomes improper to coincide the ascending speed with the descending speed for the reason of the working environment, the technique of the operator and the like, the ratio as mentioned above on the controller may be changed by a dial (not shown) or the like under his/her hand.

Figure 3:
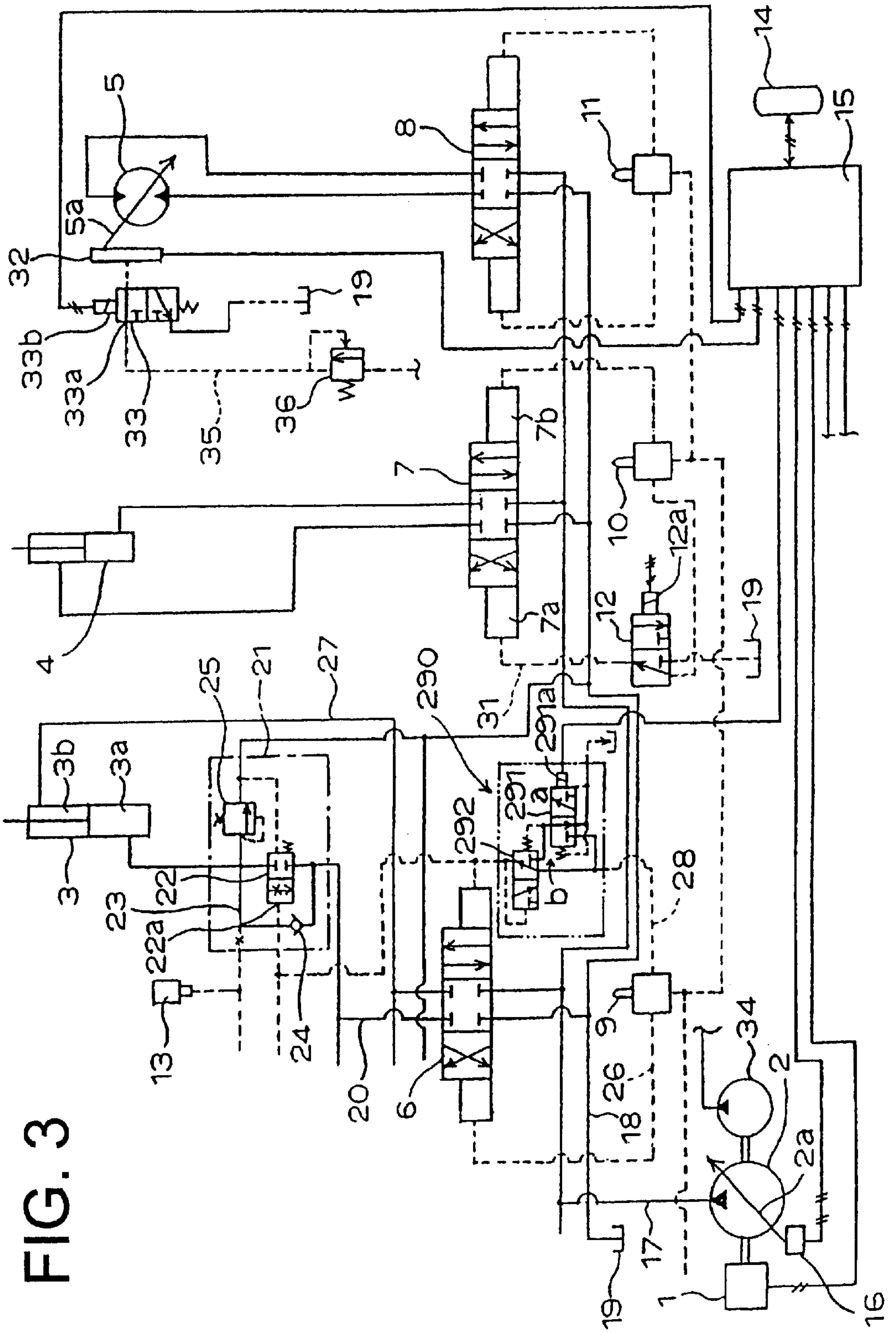
FIG. 3 is a control circuit diagram schematically showing an electric hydraulic system of a hydraulic excavator with a crane in accordance with another embodiment of the present invention.

On the other hand, in the case that no obstacle is given even by fixing the ratio mentioned above to about 1, a pressure reduction valve may be used in place of the EPC valve 29. FIG. 3 schematically shows a circuit diagram of a main part of an electric hydraulic system in the case of using the pressure reduction valve.

A pressure reducing valve 290 in this case is provided with a switch valve portion 291 for switching the pilot pressure oil of the second pilot circuit 28 fed in accordance with the operation of the main boom lever 9 between a communication side "a" and a shut-off side "b" in response to the signal from the controller 15, and a pressure reducing valve portion 292 for pressure reducing the pilot pressure oil of the second pilot circuit 28 to be fed to the second pressure receiving portion 6*b* in the descending side of the main boom valve 6 and the switch valve 22 of the rotation preventing valve 21.

The switch valve portion 291 and the pressure reducing valve portion 292 are so structured that when the crane switch 14 is turned off and the normal working mode is set, the pilot pressure oil supplied from the second pilot circuit 28 is not introduced to the switch valve portion 291 as shown in FIG. 3, but is pressure reduced to a preset pressure through one pressure reducing valve 292, and is fed to the second pressure receiving portion 6*b* in the descending side of the main boom valve 6 and the switch valve 22 of the rotation preventing valve 21. Further, when the crane switch 14 is turned on, the switch valve portion 291 is switched to the communication side "a" from the shut-off side "b", and the pilot pressure oil supplied from the second pilot circuit 28 is introduced to both of the pressure reducing valve portion 292 and the switch valve portion 291.

At this time, the pressure oil introduced to the switch valve portion 291 is applied in a direction of narrowing the throttle passage of the pressure reducing valve portion 292 so as to reduce a flow amount of the pilot pressure oil fed out from the pressure reducing portion 292, thereby further reducing the pressure. An amount of the pressure reduction is set so as to become an opening area substantially equal to the opening area of the main boom valve 6 at the time of being input to the first pressure reducing portion 6*a* through the first pilot circuit 27 by operating the main boom lever 9 toward the ascending side. As a result, the speed in the ascending side of the main boom and the stick boom becomes substantially equal to the speed in the descending side thereof only at the time of the crane operation. Therefore, the operator can previously estimate the motion of the suspended load and can execute smooth operation, so that the working efficiency is significantly improved.

The first pressure receiving portion 7*a* of the bucket valve 7 is connected to a first pilot circuit 31 of the bucket lever 10 via the solenoid controlled valve 12 for inhibiting the dumping motion of the bucket 104*c*. A solenoid 12*a* of the solenoid controlled valve 12 is electrically connected on the basis of the command signal output from the controller 15. At the time of applying an electric current to the solenoid of the solenoid controlled valve 12, the solenoid controlled valve 12 is switched to a position at an opposite side to a non-operating position shown in FIG. 1, so as to close a first pilot circuit 31 communicating the bucket valve 7 with the bucket lever 10. The pilot pressure oil within the first pilot circuit 31 is returned to the oil tank 19 through the solenoid controlled valve 12.

When the solenoid controlled valve 12 is switched in response to the operation by the crane mode switch at the time of the crane operation or the like, the first pilot circuit 31 is closed, so that the pilot pressure is not applied to the bucket valve 7 and the dump side operation of the bucket lever 10 can not be executed.

The traveling motor 5 is comprised of a swash-plate-type piston motor, and controls a sweeping capacity by tilting and rotating a swash plate 5*a* by means of capacity control means 32 on the basis of the command signal output from the controller 15. The swash plate 5*a* is connected with an electromagnetic valve 33 constituting a part of fixing means for controlling a speed of the traveling motor 5 within a low speed side range having an upper limit during the crane operation, at the time of switching to the crane mode. A pilot circuit 35 of a traveling pump 34 for supplying a pilot pressure oil is connected to a pump port 33*a* of the electromagnetic valve 33 via a pressure reducing valve 36. A solenoid 33*b* of the electromagnetic valve 33 is electrically connected to the controller 15. The fixing means is comprised of the electromagnetic valve 33, the crane mode switch 14, the controller 15 and the like.

When the command signal from the controller 15 is input to the solenoid 33*b* in response to the operation by the crane mode switch 14, the electromagnetic valve 33 is switched to a position as shown in FIG. 3. When the electromagnetic valve 33 is switched, the pressure oil supplied from the electromagnetic valve 33 is supplied to the capacity control means 32. The angle of tilt and rotation of the swash plate 5*a* is changed to a side of the maximum tilt and rotation angle so that it becomes larger, whereby the traveling motor 5 rotates at a large torque and at a low speed.

Even when the traveling lever 11 is operated, the speed of the traveling motor 5 is locked to the low speed side without being affected by the valve stroke of the traveling valve 8. Since the upper limit of the maximum speed of the traveling motor 5 is set, it is possible to secure a stability of the traveling at the time of the crane operation. When the crane mode switch 14 is turned off in operation, the electric current application to the electromagnetic valve 33 is lost, and the electromagnetic valve 33 is switched to an opposite side position to the position shown in FIG. 3 so that the pilot circuit 35 is closed. The pilot oil within the pilot circuit 35 is drained. In accordance with the present embodiment, the electromagnetic valve 33 is connected to the traveling motor 5, However, the present invention should not be limited to this. For example, there may be provided fixing means having a cut valve or the like which freely supplies and shuts off with respect to a revolving motor (not shown).

The controller 15 in the hydraulic excavator 100 with a crane in accordance with the present embodiment as structured in the manner mentioned above has a speed control section as one of the characteristic portions of the present invention, which can adjust a working speed of each of the actuators at the time of being in the crane mode. The speed control section previously stores various kinds of information such as an engine speed torque curve, a minimum engine speed required as the working vehicle, a proper pump absorbing torque at the time of operation in the crane mode and the like. When the crane mode is selected, the pump absorbing torque curve in correspondence with the engine speed is arithmetically processed within the engine speed range between the largest engine speed set at the time of switching to the crane mode on the basis of the control program and the minimum engine speed required for the working vehicle.

Figure 4:
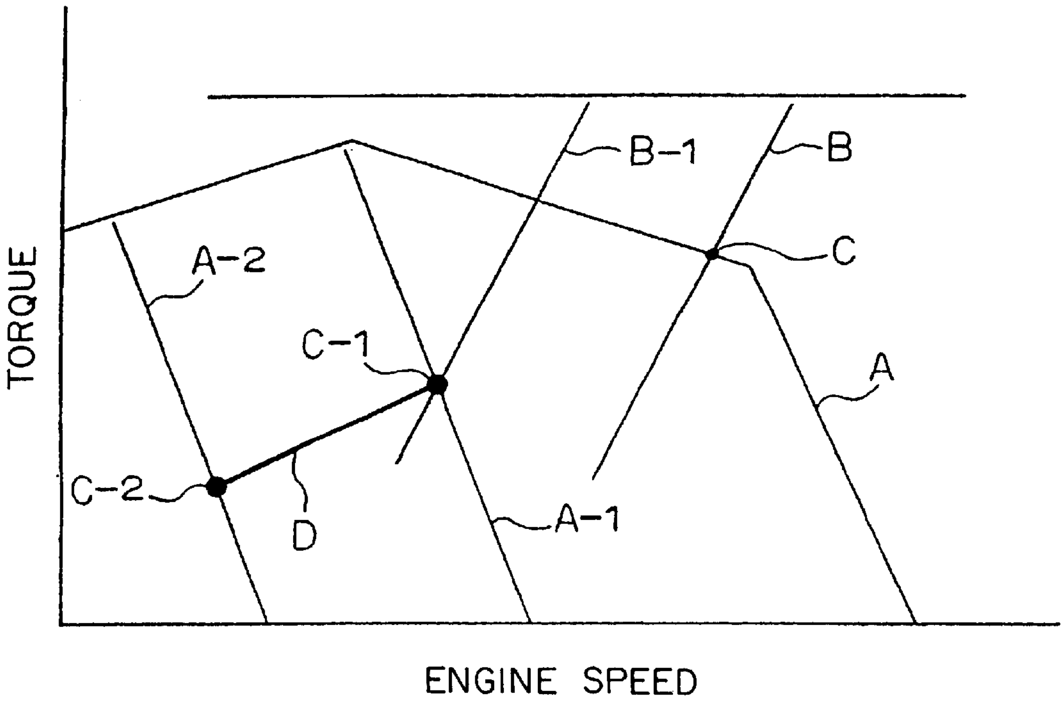
FIG. 4 is a characteristic graph showing a relation between an engine-and-pump torque and an engine speed in the hydraulic excavator.

FIG. 4 shows a relation between the engine and pump torque and the engine speed. In FIG. 4, reference symbols A and B respectively denote general engine speed torque curve and pump absorbing torque curve at the time other than in the selected crane mode, and reference symbol C denotes a proper pump absorbing torque in correspondence with the general engine speed. Reference symbols A-1 and B-1 respectively denote an engine speed torque curve and a proper pump absorbing torque curve in correspondence to the largest engine speed when operated by the crane mode switch initially set in the crane mode, and reference symbol C-1 denotes a proper pump absorbing torque in correspondence to the engine speed. An upper limit value of the pump discharge amount is set by the pump absorbing torque.

Reference symbol A-2 denotes an engine speed toque curve in correspondence to the minimum engine speed required for the working vehicle set at the time of switching to the crane mode. Reference symbol C-2 denotes a proper pump absorbing torque in correspondence to said engine speed. A lower limit value of the pump discharge amount is set by the pump absorbing torque. Reference symbol D denotes one of optional pump absorbing torque curves, which can be obtained by connecting C-1 in correspondence to the upper limit value of the pump discharge amount to C-2 in correspondence to the lower limit value at an optional point within the engine speed range between the largest engine speed set at the time of switching to the crane mode and the minimum engine speed required for the working vehicle.

When the operator selects the crane mode, the engine speed is reduced to a predetermined engine speed correspondence to the pump absorbing torque C-1. At the same time, the swash plate angle (the pump discharge amount) is changed so as to correspond to the pump absorbing torque C-1 in response to the command output from the controller 15. At the time of this crane mode, when the speed is adjusted by the operator, the swash plate angle is controlled in correspondence to the change of the pump absorbing torque on the optional pump absorbing torque curve D. The working speed of the actuators, the driving speed of the traveling motor 5 and the like in the current crane mode are expanded within the pump absorbing torque between C-1 and C-2 of the pump absorbing torque.

Here, when the operator operates the crane mode switch 14, the output signal of the crane mode switch 14 is output to the controller 15. In the speed control section of the controller 15, the pump discharge amount at an intersecting point C-1 of the engine speed torque curve A-1 at the predetermined maximum engine speed with the proper pump absorbing torque curve B-1 is set as an upper limit value. There is set an optional pump absorbing torque curve D, which can be obtained by connecting the pump absorbing torque C-1 to the pump absorbing torque C-2 in correspondence to the predetermined minimum engine speed required for the working vehicle. By initially setting the crane mode, it is possible to output the control signal on the basis of the pump absorbing torque C-1 having the above-mentioned upper limit to the electric governor motor of the engine 1, the capacity controlling means 16 of the variable delivery pump 2 and the like so as to reduce the current engine speed and reduce the pump discharge amount.

At the time of executing the crane operation on the basis of the initially set crane mode, if it is intended to restrict the working speed to a low level in accordance with the change of the work contents and the working conditions, the skill of the operator or the like, the speed adjusting switch (the engine speed dial) is selectively operated by the operator. Then, the command signal in correspondence to the crane working speed, which changes in accordance with an optional pump absorbing torque curve on the above-mentioned optional pump absorbing torque curve D, is output to the electric governor motor, the capacity control means 16 and 32 and the like. In correspondence to the change of the work contents and the working conditions, the skill of the operator or the like, it is possible to further reduce the engine speed, the pump discharge amount and the like, so that the working speed of the working machine cylinders 3 and 4, the driving speed of the traveling motor 5 and the like in the current crane mode can be adjusted to an optional speed.

As is apparent from the description mentioned above, in accordance with the working vehicle of the present embodiment, by employing the speed control section of the controller 15, even under various kinds of environments such as the change of the working range, with or without the obstacle and the like, it is possible to effectively obtain the optimum crane mode in correspondence to the working speed of the crane mode, the driving speed of the traveling motor 5, the skill of the operator or the like. Therefore, not only it is possible to realize a further stable vehicle traveling property and an operability of the crane, but also it is possible to significantly improve the operability of the crane operation and it is possible to further improve a working efficiency or the like.

What is claimed:

1. A speed control apparatus of a working vehicle controlling a working speed of each of actuators at a time of being in a crane mode, comprising:

setting means for a maximum engine speed to be set at a time of being switched to the crane mode;

setting means for setting a proper pump absorbing torque curve at the time of being switched to the crane mode;

setting means for setting a pump discharge amount introduced from an intersecting point of an engine speed torque curve at said maximum engine speed with said proper pump absorbing toque curve to be an upper limit;

setting means for an optional pump absorbing torque curve being within a range of said engine speed torque curve and capable of obtaining an optional pump discharge amount which is smaller than said pump discharge amount set as said upper limit and which is larger than a pump discharge amount introduced from the pump absorbing torque in correspondence to a minimum engine speed at the time of being in the crane mode; and setting means for setting a pump tilt and rotation angle in correspondence to a change of the pump absorbing torque.

2. A speed control apparatus of a working vehicle according to claim 1, further including pilot pressure adjusting means in a side of a pilot pressure receiving chamber of a main valve for distributing a working fluid to an actuator such as a main boom cylinder and the like, wherein an opening area of said main valve is adjusted by said pilot pressure adjusting means.

3. A speed control apparatus of a working vehicle according to claim 2, wherein an opening area of the main valve for distributing a working fluid to an actuator such as a main boom cylinder and the like at the time of being in the crane mode is set such that a descending speed of a periphery of a mounting portion of a suspending hook mounted to a front end side of a stick boom is reduced to be substantially equal to an ascending speed thereof.

4. A speed control apparatus of a working vehicle according to claim 1, wherein an opening area of the main valve for distributing a working fluid to an actuator such as a main boom cylinder and the like at the time of being in the crane mode is set such that a descending speed of a periphery of a mounting portion of a suspending hook mounted to a front end side of a stick boom is reduced to be substantially equal to an ascending speed thereof.

* * * * *